(12) United States Patent
Child

(10) Patent No.: X9287
(45) Date of Patent: Dec. 15, 1835

(54) RAZOR, SHARPENING, APPLICATION OF ADHESIVE STATE

(76) Inventor: William Child

William Child

Patent for adhesive polishing slate, for sharpening Razors
and all other Edge tools The schedule referred to in these Letters Patent, and making
part of the same, containing a description, in the words of the said
William Child, himself, of his improvement in the application of
adhesive polishing slate, for sharpening Razors and all other
Edgetools.

---

To all, to whom these Presents shall come, Be it
known, that I William Child, of the City of Baltimore in
the state of Maryland, have invented a new and useful
application of a certain Slate for the sharpening of razors, sur-
gical instruments, and all other edge tools.

This discovery consists in applying adhesive or polishing
slate for the purpose aforesaid, which slate or matter, is com-
posed principally of Silica of Alumine, Water, Oxide of iron
a trace of lime and a trace of Magnesia its specific gravity
2. 6 8. 2. 8.

This matter or slate may be used in any form most
convenient either as a hone, or being pulverised into a fine pow-
der may be placed on common razor straps, on wood, plates
of iron, steel, tin or other material, such material to be first
rubbed with sweet or other oil, hogs lard or tallow, lard
having the preference, and the powder then sifted on, or it may
be scraped on with a knife or other flat instrument, before
being pulverised.

What I claim as my invention, is the application of
slate or matter of the character above described to the sharpening
of the instruments and edgetools aforesaid

Wit { B. K. Mansell
ups { J. Hamilton

William Child